United States Patent

[11] 3,572,520

| [72] | Inventors | Dewey M. Evans<br>Farmington;<br>Peter J. Manetta, Warren, Mich. |
|---|---|---|
| [21] | Appl. No. | 845,221 |
| [22] | Filed | July 28, 1969 |
| [45] | Patented | Mar. 30, 1971 |
| [73] | Assignee | Simplex Corporation<br>Detroit, Mich. |

[54] AUTOMATIC LOADING MECHANISM
10 Claims, 9 Drawing Figs.

[52] U.S. Cl. .................................................. 214/1,
82/2.5
[51] Int. Cl. ...................................................... B23b 13/00
[50] Field of Search ............................................ 214/1 (BZ),
1 (B); 82/2.5, 2.7

[56] References Cited
UNITED STATES PATENTS
2,813,380  11/1957  Narel ............................ 214/1(BZ)X
FOREIGN PATENTS
623,826  8/1961  Italy ............................ 214/1(B4)

*Primary Examiner*—Gerald M. Forlenza
*Assistant Examiner*—George F. Abraham
*Attorney*—Whittemore, Hulbert and Belknap ABSTRACT: Automatic loading mechanism comprising a pair of elongated arms movable longitudinally along converging paths with work supporting cradles at the free ends. The cradles move in curved paths due to combination longitudinal movement of the arms and cam controlled rocking movement thereof.

Patented March 30, 1971 3,572,520

INVENTORS
DEWEY M. EVANS
PETER J. MANETTA
BY
Whittemore Hulbert
& Belknap
ATTORNEYS

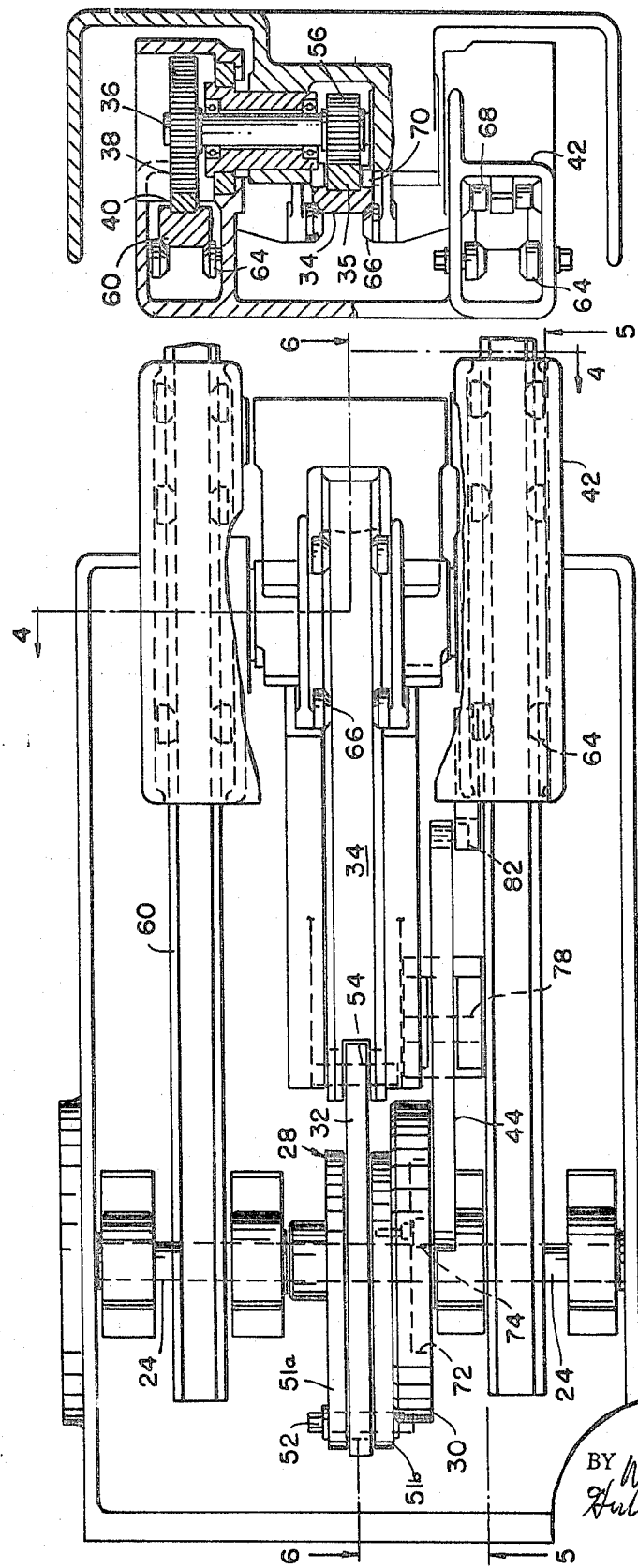

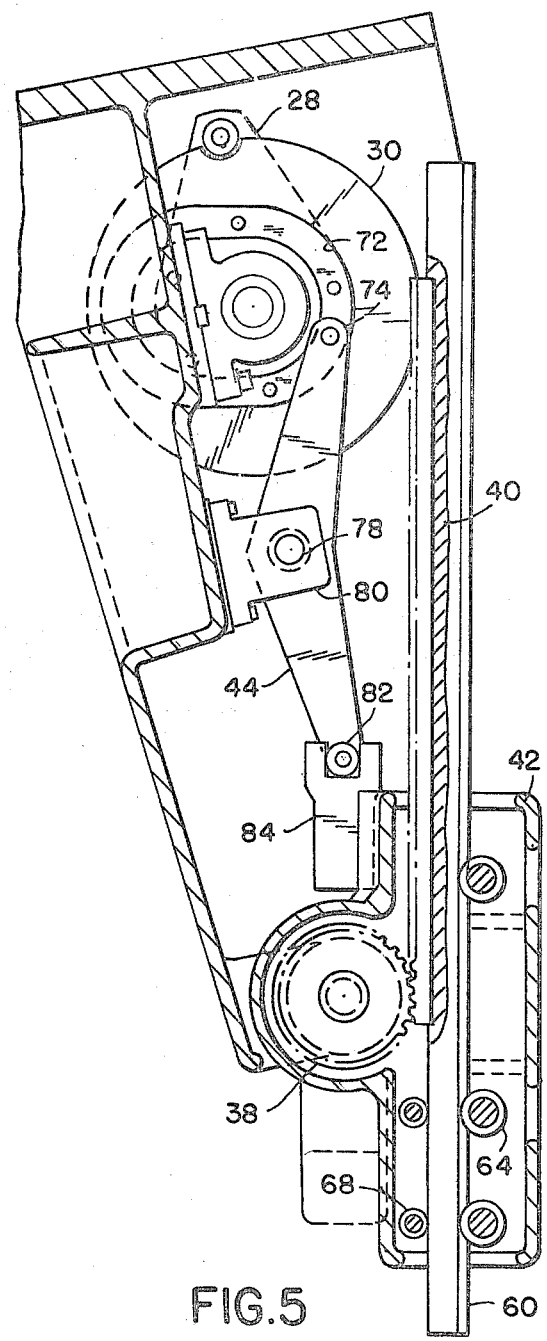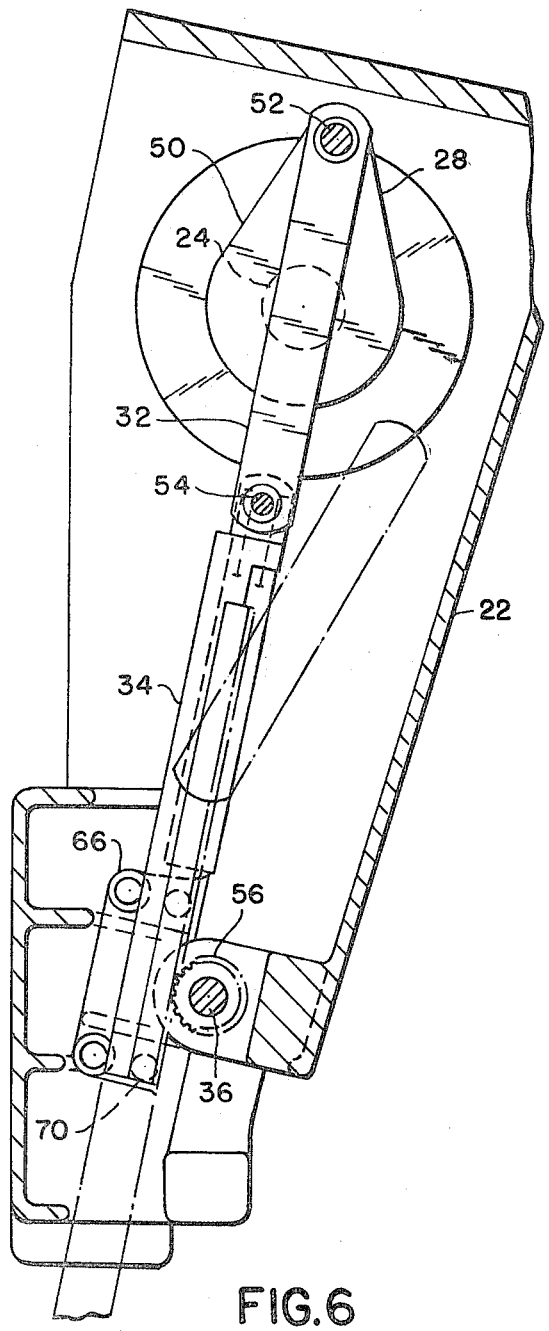

INVENTORS
DEWEY M. EVANS
PETER J. MANETTA
BY
ATTORNEYS

AUTOMATIC LOADING MECHANISM

BRIEF SUMMARY OF THE INVENTION

The automatic loading mechanism is intended for transferring workpieces from a predetermined station of a conveyor to a machine tool, and to move a finished workpiece from the machine tool to the same station on the conveyor.

At the conveyor a work support cradle is moved into position beneath an unfinished workpiece and lifts it off the conveyor. As soon as the work supporting station at the conveyor is empty a second work support cradle deposits a finished workpiece on the conveyor. The two work support cradles are then moved to position adjacent the machine tool where the empty cradle moves in a curved path beneath the finished workpiece and lifts it from the machine tool. As soon as the finished workpiece has cleared the machine tool the other cradle deposits an unfinished workpiece thereat.

The work supporting cradles comprise a pair of curved upwardly concave support elements. Depending upon the shape of the workpiece and other considerations, it becomes desirable in many cases to program the paths of movement of the cradles so as to move them most expeditiously into position beneath a workpiece and to lift the workpiece or alternatively, to lower a workpiece onto a support and then to move downwardly away from the workpiece and return.

In the present case this is accomplished by providing a drive shaft having a rotary cam and a crank thereon. The crank is connected by a connecting rod to a rack which through multiplying pinions actuates supporting racks constituting arm means which carry the cradles at the outer free end thereof. The arm and racks are mounted for longitudinal movement in a housing pivoted to a fixed support. The racks are guided for movement tangentially of the pinions so that the racks may be caused to tilt about the axes of the pinions.

The cam has cam follower means associated therewith connected to the guide structure for the arm means so that the arm means is moved longitudinally and tilted in timed relation to its longitudinal movement so as to permit programming the curved paths of movement of the cradles. With this arrangement it is a simple matter to provide different curved paths of movement simply by replacing the rotary cam.

BRIEF DESCRIPTION OF THE DRAWINGS

FIG. 3 is an elevational view of the actuating mechanism, with parts broken away.

FIG. 4 is an end view, partly in section, substantially on the line 4-4, FIG. 3.

FIG. 5 is a sectional view on the line 5-5, FIG. 3.

FIG. 6 is a sectional view on the line 6-6, FIG. 3.

DETAILED DESCRIPTION

Figure 1:
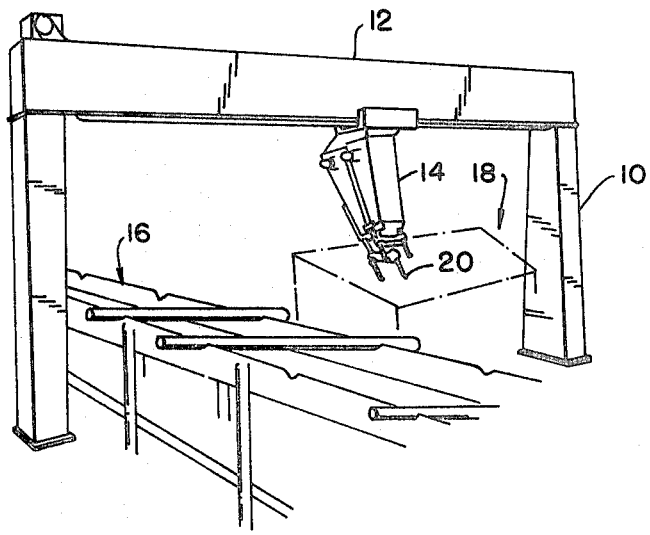
FIG. 1 is a fragmentary elevational view showing the relationship of parts.
Figure 7:
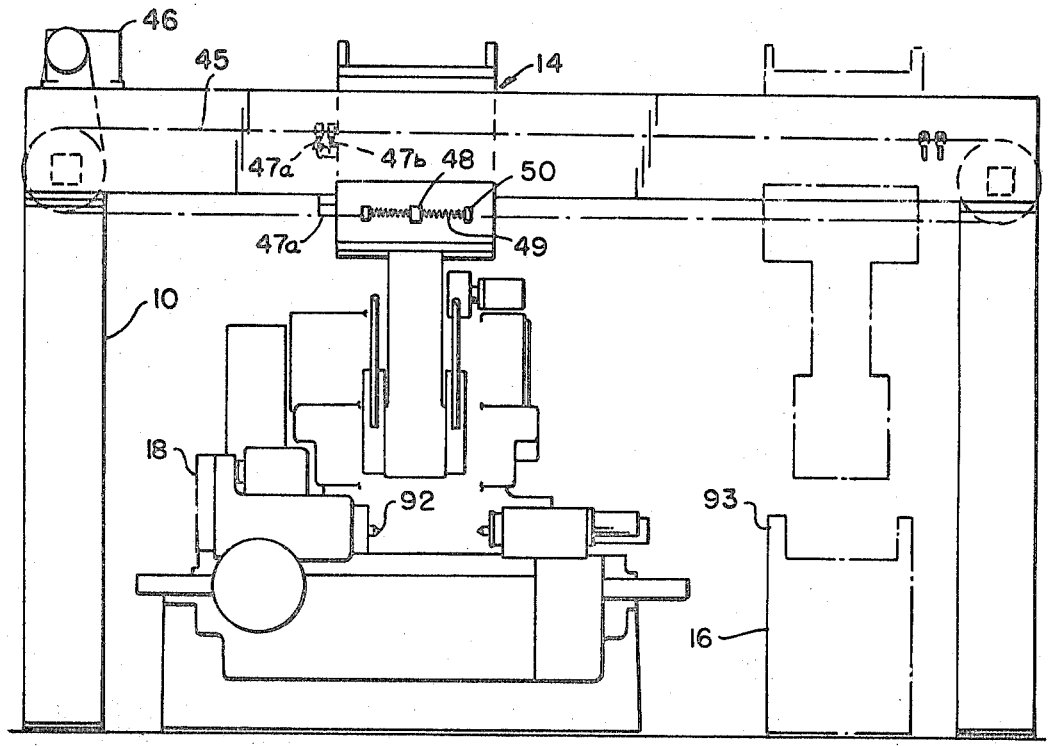
FIG. 7 is an end view of the loading mechanism showing its relation to the machine tool and a transfer conveyor.

Referring first to FIGS. 1 and 7 the loading mechanism comprises a pair of columns 10 and a horizontal frame member 12 having a trackway thereon on which the transfer loader carriage 14 is horizontally movable from a position above the conveyor indicated generally at 16, to a position adjacent a machine tool diagrammatically indicated at 18. The machine tool may be of any type such for example as a grinder, and the workpieces may have substantially any configuration capable of being lifted and supported by the cradles formed by a pair of upwardly concave supports 20.

Figure 2:
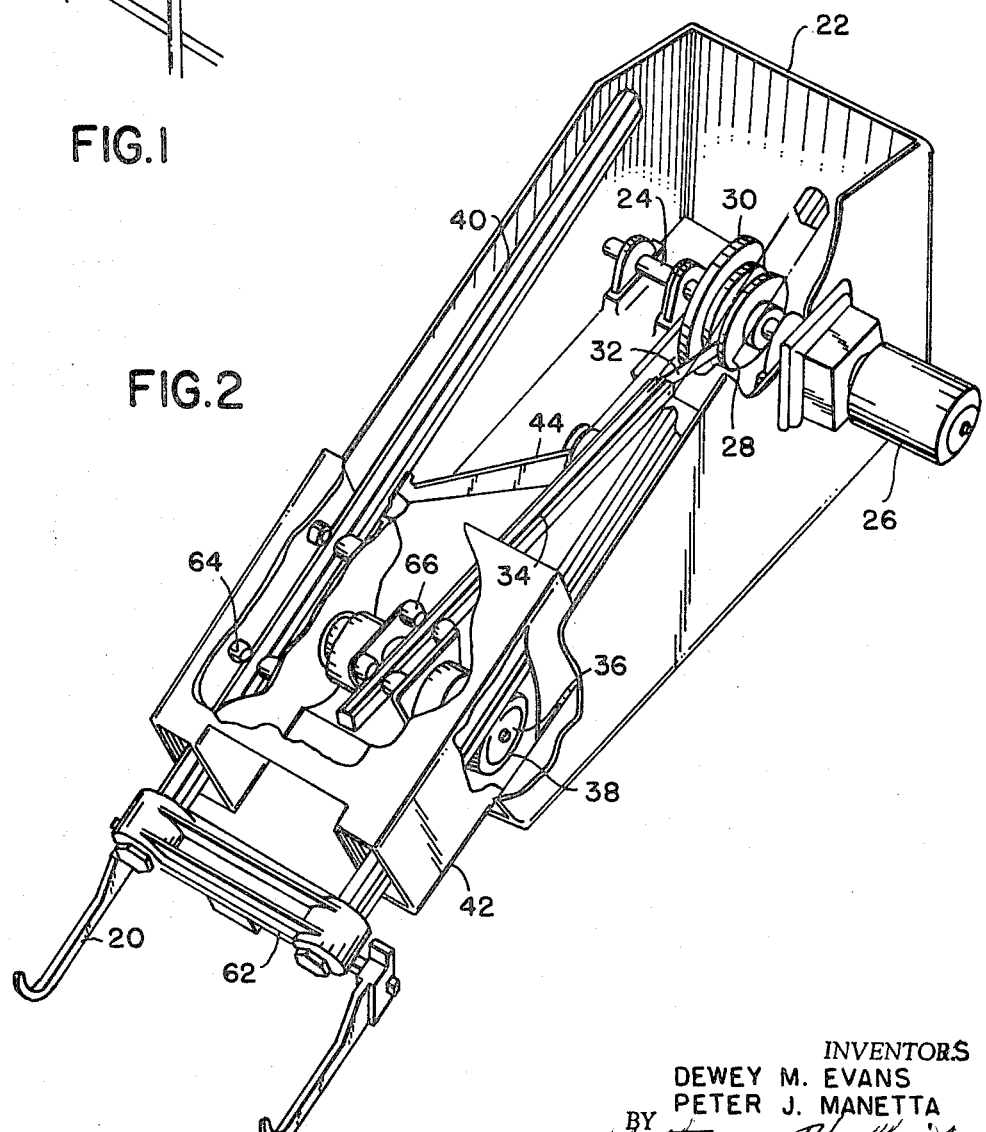
FIG. 2 is an enlarged perspective view of one of the transfer units, with parts broken away.

Referring more particularly to FIG. 2, the transfer carriage comprises a pair of housings 22 each carrying at its interior a shaft 24 connected to an electric or fluid operated motor 26 mounted on the outside of the housing. The shaft 24 carries a crank 28 and a cam 30, details of which will subsequently appear. The crank 28 has a connecting rod 32 connected to a driving rack means 34 including a rack member 25 meshing with pinion 56 secured to a shaft 36 carrying a pair of larger pinions or gears 38 which are in mesh with elongated racks 40, the racks 40 and arms 60 together constituting longitudinally movable arm means mounted for guided movement in a tilted or pivoted frame 42. The frame 42 includes means supporting the arms 60 for movement tangentially of the pinions in mesh therewith.

The cam 30 is provided with a cam follower in the form of a lever 44 one end of which engages in a slot in the cam 30 and the other end of which has a pivot connection to the guide frame 42.

With this arrangement, since the motor 26 effects accurately timed movement of the drive rack 34 as well as the tilting cam 30, the path of movement of the cradles formed by the supports 20, can be accurately predetermined. Moreover, it may be changed simply by replacing the tilting cam 30.

The horizontal movement of the transfer carriage 14 may be accomplished by a chain drive diagrammatically indicated at 45 in FIG. 7. The chain 45 is driven from a sprocket which in turn is driven by a motor 46. Movement of the carriage 14 into transfer position is terminated by engagement with a rigid abutment 47a. As the carriage 14 approaches the abutment 47a it operates switches 47b and 47c sequentially. Operation of the switch 47b slows the motor 46 and the operation of the switch 47c terminates operation of the motor. The motor 46 may be provided with a brake which is applied automatically when the motor is deenergized. In any case, the motor continues slight additional rotation after deenergization and the carriage 14 coasts into engagement with the abutment 47a. The chain 45 is provided with an abutment 48 between opposed compression springs 49 and abutments 50 provided on the carriage 14. Accordingly, one of the springs 49 is compressed as a result of additional movement of the abutment 48 after engagement between the carriage 14 and the abutment 47a. This arrangement provides spring means holding the carriage in accurately located position during a transfer operation.

Referring to the more detailed views of FIGS. 3—6, shaft sections 24 connect to the crank indicated generally at 28 which is constituted by spaced plates 51a and 51b interconnected by a crank-pin 52 to which the connecting rod 32 is connected. At its other end the connecting rod is pivoted as indicated at 54 to the drive rack means 34 which is in mesh with a pinion 56 carried by a shaft 36 journaled in suitable bearings in the housing 22. Pinion 56 is connected to shaft 36 carrying at opposite ends relatively large pinions or gears 38 each of which is in mesh with one of the racks 40.

In detail, as best seen in FIG. 4, the racks 40 are rigidly connected to and form a part of elongated arms 60, the outer ends of which are interconnected by the crosshead 62 which carries the upwardly concave support elements 20.

The guide frame 42 is pivoted by means including the shaft 36, so that rocking movement of the guide frame takes place about the axis of the shaft 36.

In order that rocking movement of the guide frame 42 may take place while retaining the proper meshing relationship between the pinion 56 and the rack 34, and also the pinions 38 and the rack 40, the frame 42 includes rollers 64 which maintain the arms 60 in position such that the racks 40 carried thereby remain in proper mesh with the gears or pinions 59. Similarly, rollers 66 retain rack means 34 in position such that rack member 35 remains in mesh with pinion 56. Rollers 68 engage opposite sides of arms 60, and rollers 70 engage opposite sides of the rack means 34.

The cam 30 car includes a cam slot 72 which receives a follower 74 carried by one end of a bellcrank lever 44 pivoted intermediate its ends as indicated at 78 by a bracket 80. The other end of the lever 44 includes a roller 82 movable in a parallel-sided slot provided in a bracket 84 fixed to the guide frame 42.

With this arrangement, as the motor 26 rotates the shaft sections 24 the cam 30 is rotated in timed relation with the crank 28 so that longitudinal and tilting movement of the arms 60 is controlled to provide any predetermined path for the work support cradles formed by the lifting elements 20.

Figure 8:
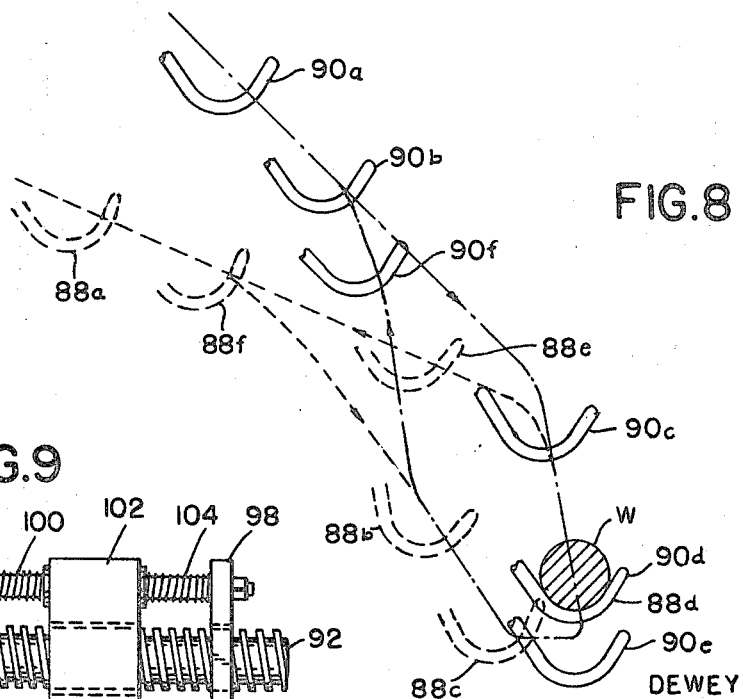
FIG. 8 is a diagrammatic study showing a typical arrangement of paths of movement of the work supporting cradles.

In FIG. 8 one of the cradles, here designated 88, moves through a series of positions designated respectively 88a, 88b, 88c, 88d, 88e, and 88f. In the position designated 88d, and also in the position 90d as will subsequently appear, the cradle 88 engages the workpiece W which may be assumed has been machined by the machine 18, and centers 92 retracted to leave the work piece free to be lifted form the machine by the transfer carriage. Accordingly, the empty cradle 88 picks up the finished workpiece and moves it from the position 88d, through positions 88e and 88f, back to the starting position 88a. As soon as the finished workpiece has cleared the path of movement of an unfinished workpiece carried by the cradle 90, the cradle 90 moves through a sequence of positions separately designated 90a, 90b, 90c, 90d, 90e and 90f. It will be assumed that at the position 90d the workpiece, here designated W, will engage a work support which will retain the workpiece in the position illustrated while the cradle 90 moves downwardly to the position 90e and thence laterally and upwardly through the position 90f to its original position 90a.

With this arrangement the finished workpiece is removed most expeditiously and replaced with an unfinished workpiece. As soon as the unfinished workpiece has been deposited on work supporting means of the machine, the transfer carriage may be moved to the right as seen in FIG. 7 to bring the finished workpiece into registration with the rails 93 of the conveyor 16.

By employing a rotary device for effecting longitudinal movement of the arms 40 and rotary cam means for effecting rocking movement of the arms about the axes of the pinions, structure if provided which may be changed to provide different paths of movement by the simple expedient of replacing cams 30.

It will of course be apparent that due to the different sizes of the pinions 56 and 38, longitudinal movement of the arms 40 greatly in excess of the throw of the crank 28 may be obtained.

Referring particularly to FIGS. 5 and 6 it will be observed that a complete rotation of the shaft 24 results in a forward and back movement of the arm 60. At the same time it results in a complete rotation of the cam 30. Due to the combination longitudinal movement and tilting of the arm 60, the cradle 20 at the free end of the arm is caused to move in a closed path from one of the retracted positions best illustrated in FIG. 8, and return. Depending upon the direction of rotation of the cam, this movement can cause the cradle to move in under the workpiece to lift the workpiece and return it to the upper or "carry" position. If the motor is reversed so that the cam rotates in the opposite direction, the cradle will move in the same closed path but in the opposite direction. This will cause the cradle to move downwardly past the work supporting position indicated in FIG. 8 at 88d and 90d, thus depositing a workpiece in the machine tool or at the previously mentioned station in the conveyor system.

Figure 9:
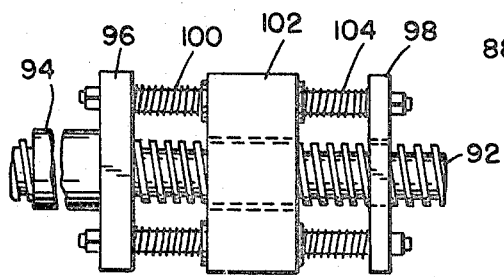
FIG. 9 is an enlarged fragmentary view showing a ball nut and screw transfer device.

Referring now to FIG. 9 there is illustrated a modified construction for effecting movement of the carriage back and forth between the conveyor 16 and the machine tool 18. In this case, rather than providing a chain for effecting such movement, there is provided an elongated screw shaft 92 which may be driven by a suitable motor corresponding to the motor 46 illustrated in FIG. 7. Associated with the screw shaft 92 is a ball nut 94 carrying a bracket 96 connected to a plate 98 by posts 100. The carriage corresponding to the carriage 14 as illustrated in FIG. 7, includes an abutment portion 102 and compression springs 104 are provided between the abutment portion 102 and the bracket 96 and plate 98. Accordingly, as the motor driving the shaft 92 is first slowed and then deenergized at the appropriate point in travel, the carriage moves into engagement with the stationary abutment and the additional movement of the screw shaft 92 occasioned by coasting of the motor is permitted by compression of the springs 104 at one side or the other of the abutment 102.

Alternatively, the carriage 14 might be moved by other driving means such for example as pinion means driving elongated racks.

We claim:

1. Mechanism for transferring a workpiece from a station on a conveyor system to a machine tool and for transferring a finished workpiece back from the machine tool to said station comprising a carriage, a pair of work supports each comprising a cradle, cradle actuating means for moving one of said cradles in a closed loop to lift and unfinished workpiece from said station and to thereafter move said other cradle in a closed loop to deposit a finished workpiece at said station while said carriage is adjacent said conveyor, means for moving said carriage to position adjacent the machine tool, said cradle actuating means being operable to move said other cradle in a closed loop to lift a finished workpiece from the machine tool and to thereafter move said one cradle in a closed loop to deposit the unfinished workpiece at the machine tool, each of said work supports comprising an elongated arm having rack teeth thereon, a pinion on said carriage in mesh with said rack teeth, guide means pivoted to said carriage to maintain the rack teeth of said arm in mesh with said pinion while said guide means and arm is tilted about the axis of said pinion, and cam means movable in timed relation to longitudinal movement of said arm effective to tilt said guide mans, said arm having said cradle at its free end movable in a curved path determined by longitudinal movement of said arm and tilting movement thereof about the axis of said pinion.

2. Mechanism as defined in claim 1 in which said cam means comprises a rotary cam, a crank rotatable in timed relation to said cam, a driving rack connected to aid crank, a drive pinion in mesh with said driving rack, and means connecting said drive pinion to the pinion in mesh with the rack teeth on said arm.

3. Mechanism as defined in claim 2 in which said guide means comprises a pivoted guide frame mounted for tilting movement about the axes of said pinions, and means in said frame guiding said driving rack and said arm tangentially of the pinions associated therewith.

4. Mechanism as defined in claim 1 in which each of said work support means comprises a pair of parallel arms having rack teeth thereon, and a pair of pinions on said carriage each in mesh with one of said arms.

5. Mechanism as defined in claim 4 in which said pair of pinions are connected adjacent the ends of said shaft, a drive pinion being connected to said shaft intermediate the pinions of said pair.

6. Mechanism as defined in claim 2 in which the pinion in mesh with said arm is substantially larger than said drive pinion.

7. Mechanism as defined in claim 2 comprising a motor on said carriage, a shaft connected to be driven by said motor, said cam and said crank being connected to said arm.

8. Mechanism as defined in claim 7, said motor being reversible so as to effect movement of the cradle at the free end of said arms so as to move said cradle in opposite directions in a closed loop so as to effect a work pickup or work-depositing operation depending upon the direction of motor operation.

9. Mechanism as defined in claim 1 in which said guide means comprises a frame having a multiplicity of opposed rollers thereon to engage the arms carrying the racks and the drive rack.

10. Mechanism as defined in claim 1 in which the means for moving said carriage comprises resilient means, a rigid abutment engageable by a member movable with said carriage whereby said carriage is maintained in accurately located position against said abutment by said resilient means.